US012015856B2

(12) United States Patent
Galor Gluskin

(10) Patent No.: US 12,015,856 B2
(45) Date of Patent: Jun. 18, 2024

(54) IMAGE PROCESSING FOR APERTURE SIZE TRANSITION IN A VARIABLE APERTURE (VA) CAMERA

(71) Applicant: QUALCOMM Incorporated, San Diego, CA (US)

(72) Inventor: Micha Galor Gluskin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/809,712

(22) Filed: Jun. 29, 2022

(65) Prior Publication Data
US 2024/0007757 A1    Jan. 4, 2024

(51) Int. Cl.
*H04N 23/80* (2023.01)
*H04N 23/75* (2023.01)
*H04N 23/76* (2023.01)

(52) U.S. Cl.
CPC ............. *H04N 23/80* (2023.01); *H04N 23/75* (2023.01); *H04N 23/76* (2023.01)

(58) Field of Classification Search
CPC ........ H04N 23/80; H04N 23/75; H04N 23/76; H04N 23/72
See application file for complete search history.

(56) References Cited

U.S. PATENT DOCUMENTS

| 5,428,421 | A | * | 6/1995 | Kawahara | ............ | H04N 23/663 |
| | | | | | | 348/E5.04 |
| 6,052,692 | A | * | 4/2000 | Anderson | ............ | H04N 1/2112 |
| | | | | | | 707/999.102 |
| 7,391,440 | B2 | * | 6/2008 | Rooy | ............ | H04N 23/661 |
| | | | | | | 348/E5.022 |
| 8,032,019 | B2 | * | 10/2011 | Shibuno | ............ | G03B 7/093 |
| | | | | | | 396/213 |
| 9,762,806 | B2 | * | 9/2017 | Nakata | ............ | H04N 23/71 |
| 2011/0317063 | A1 | * | 12/2011 | Toguchi | ............ | H04N 23/72 |
| | | | | | | 348/E5.04 |
| 2012/0212642 | A1 | | 8/2012 | Kehtarnavaz et al. | | |

FOREIGN PATENT DOCUMENTS

DE    102013209164 B4 *  1/2023   ............. G03B 7/095
JP       2013098779 A *  5/2013

OTHER PUBLICATIONS

International Search Report and Written Opinion—PCT/US2023/066616—ISA/EPO—Aug. 4, 2023.

* cited by examiner

*Primary Examiner* — Timothy J Henn
(74) *Attorney, Agent, or Firm* — Qualcomm/Norton Rose Fulbright US LLP

(57) ABSTRACT

This disclosure provides systems, methods, and devices for image signal processing that support variable aperture (VA) camera operation. In a first aspect, a method of image processing includes receiving first image data from a variable aperture (VA) camera acquired at a first aperture size; determining a first set of output image frames based on the first image data; receiving second image data from the VA camera acquired during an aperture size transition; and determining a second set of output image frames based on the first image data and the second image data, wherein determining the second set of output image frames comprises adjusting a characteristic of the second image data based on the first image data. Other aspects and features are also claimed and described.

27 Claims, 6 Drawing Sheets

IMAGE PROCESSING FOR APERTURE SIZE TRANSITION IN A VARIABLE APERTURE (VA) CAMERA

TECHNICAL FIELD

Aspects of the present disclosure relate generally to image processing, and more particularly, to image processing for variable aperture cameras. Some features may enable and provide improved image processing, including improving brightness matching during aperture size transitions.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Image capture devices may include multiple cameras with different fixed aperture sizes configured to provide different representations of a scene. For example, a large aperture size may produce a short depth of focus desirable for portrait photography in which the background is blurred. As another example, a smaller aperture size may produce a large depth of focus desirable for landscape photography in which the foreground and background of the scene is sharp. The image device may switch between cameras with different fixed aperture sizes based on user input to select a type of photography.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Adding cameras to an image capture device may increase cost and increase physical dimensions. A variable aperture (VA) camera may be used to replace multiple fixed aperture size cameras or to provide additional functionality to fixed aperture size cameras. In a VA camera, the aperture size may be variable, such as between discrete sizes or as a continually variable size. The image capture device may control the VA camera to obtain photos or videos representing a scene with desired characteristics. In VA cameras, the sensitivity of a camera (which may include the aperture and also a lens and an image sensor) may be different across different aperture settings. As the VA camera changes apertures to obtain a representation of a scene with one desired characteristic (e.g., sharp or blurry background), the changing aperture size may result in an undesirable change in other characteristics of the representation of the scene. For example, decreasing aperture size to obtain a sharp background may lead to a lower brightness than the VA camera would obtain at a larger aperture size. Techniques described here may be used to process image data from the VA camera to reduce or eliminate the undesirable changes in image characteristics resulting from use of the VA camera, and particularly during aperture size transitions of the VA camera.

In one aspect of the disclosure, a method for image processing includes receiving first image data acquired at a first aperture size; determining a first set of output image frames based on the first image data; receiving second image data acquired during an aperture size transition; and determining a second set of output image frames based on the first image data and the second image data, wherein determining the second set of output image frames comprises adjusting a characteristic (e.g., brightness) of the second image data based on the first image data. The first set of output image frames and the second set of output image frames may form a sequence of images, and may displayed as an output preview in a camera application to view the output of an image capture device. The first and second sets of output image frames may have a reduced disruption in the appearance of the preview during the aperture size transition.

In an additional aspect of the disclosure, an apparatus includes at least one processor and a memory coupled to the at least one processor. The at least one processor is configured to perform operations including receiving first image data acquired at a first aperture size; determining a first set of output image frames based on the first image data; receiving second image data acquired during an aperture size transition; and determining a second set of output image frames based on the first image data and the second image data, wherein determining the second set of output image frames comprises adjusting a characteristic (e.g., brightness) of the second image data based on the first image data.

In an additional aspect of the disclosure, an apparatus includes means for receiving first image data acquired at a first aperture size; means for determining a first set of output image frames based on the first image data; means for receiving second image data acquired during an aperture size transition; and means for determining a second set of output image frames based on the first image data and the second image data, wherein determining the second set of output image frames comprises adjusting a characteristic (e.g., brightness) of the second image data based on the first image data.

In an additional aspect of the disclosure, a non-transitory computer-readable medium stores instructions that, when executed by a processor, cause the processor to perform operations. The operations include receiving first image data acquired at a first aperture size; determining a first set of output image frames based on the first image data; receiving second image data acquired during an aperture size transition; and determining a second set of output image frames based on the first image data and the second image data, wherein determining the second set of output image frames comprises adjusting a characteristic (e.g., brightness) of the second image data based on the first image data.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The ISP may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor. In some embodiments, the processing of one or more image frames may be performed within the image sensor, such as in a binning module. The image processing techniques described in embodiments disclosed herein may be performed by circuitry, such as a binning module, in the image sensor, in the image signal processor (ISP), in the application processor (AP), or a combination or two or all of these components.

In an example, the image signal processor may receive an instruction to capture a sequence of image frames in response to the loading of software, such as a camera application, to produce a preview display from the image capture device. The image signal processor may be configured to produce a single flow of output frames, based on images frames received from one or more image sensors. The single flow of output frames may include raw image data from an image sensor, binned image data from an image sensor, or corrected image frames processed by one or more algorithms, such as in a binning module, within the image signal processor. For example, an image frame obtained from an image sensor, which may have performed some processing on the data before output to the image signal processor may be processed in the image signal processor by processing the image frame through an image post-processing engine (IPE) and/or other image processing circuitry for performing one or more of tone mapping, portrait lighting, contrast enhancement, gamma correction, etc.

After an output frame representing the scene is determined by the image signal processor using the image correction, such as binning described in various embodiments herein, the output frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, frames for object tracking, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations.

In some aspects, the corrected image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
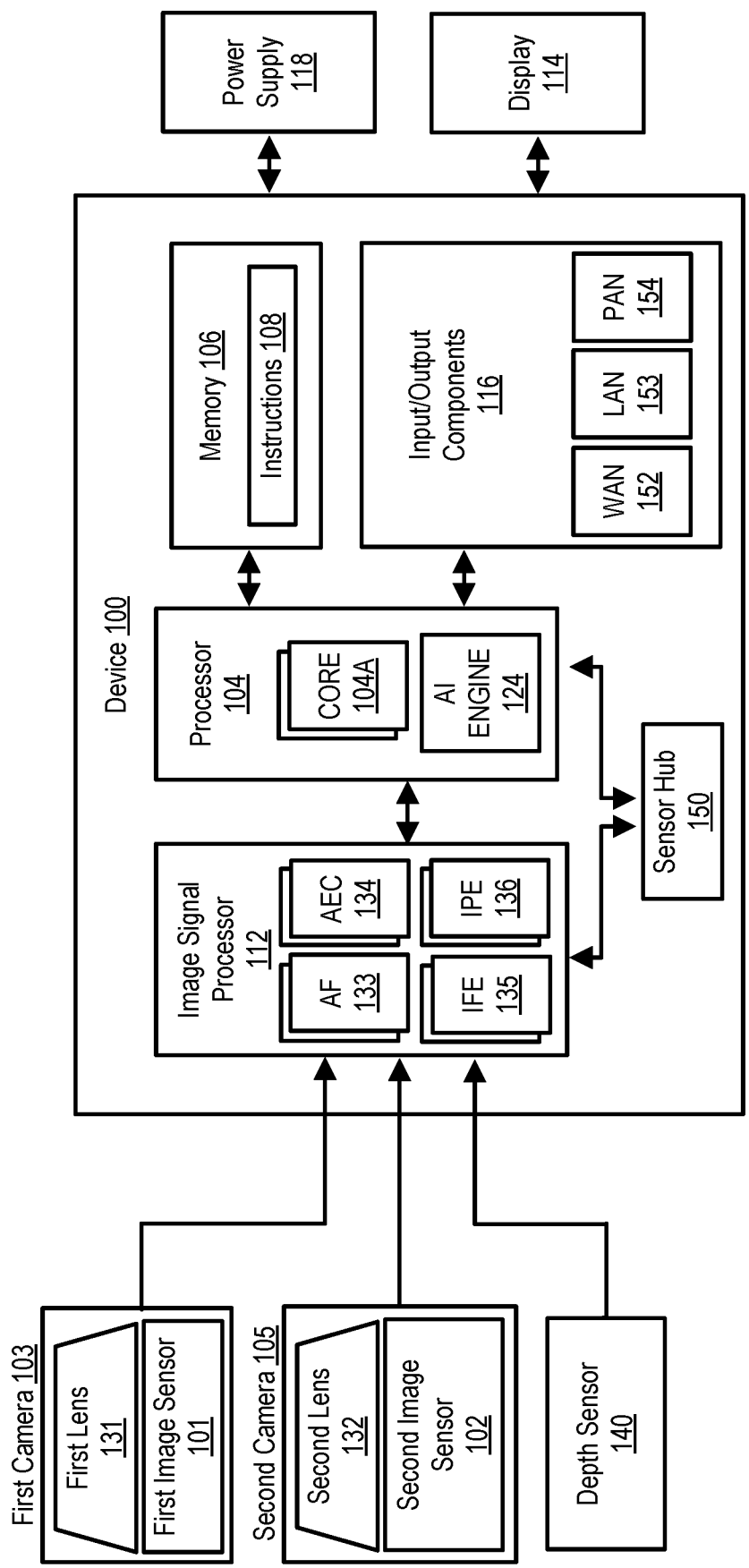
FIG. 1 shows a block diagram of an example device 100 for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image processing to improve performance of image capture devices, and particularly in image capture devices with variable aperture (VA) cameras. During an aperture size transition of the VA camera, image processing may be applied to image data acquired at potentially unknown and/or changing apertures to match one or more characteristics of image data captured during the aperture size transition with image data captured in a stable, steady state condition prior to the aperture size transition.

Particular implementations of the subject matter described in this disclosure may be implemented to realize one or more of the following potential advantages or benefits. In some aspects, the present disclosure provides techniques for improving the appearance of a sequence of images captured during an aperture size transition by matching a characteristic of image data captured during the aperture size transition with image data before the aperture size transition. For example, brightness of frames captured during the aperture size transition can be matched to brightness of frames capture before the aperture size transition to reduce abrupt changes that may appear in a stream of image data received during the aperture size transition. This may be particularly useful when the aperture size transition occurs faster than other camera control algorithms, such as auto exposure (AE), can adjust to the aperture size changes. The aperture size transition may occur in a continuous manner such that the AE algorithm does not have time to settle at a value that obtains a desired brightness value for the image data, but the image processing described according to embodiments herein may respond during the aperture size transition by basing a modification of the image data on previous image data.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is a IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor (ISP) 112 may receive image data, such as used to form image frames. In one embodiment, a local bus connection couples the image signal processor 112 to image sensors 101 and 102 of a first camera 103 and second camera 105, respectively. In another embodiment, a wire interface couples the image signal processor 112 to an external image sensor. In a further embodiment, a wireless interface couples the image signal processor 112 to the image sensor 101, 102.

The first camera may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines (IPEs) 136, and or one or more auto exposure compensation (AEC) 134 engines. The AF 133, AEC 134, IFE 135, IPE 136 may each include application-specific circuitry, be embodied as software code executed by the ISP 112, and/or a combination of hardware within and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including noise reduction operations. For example, execution of the instructions can instruct the image signal processor 112 to begin or end capturing an image frame or a sequence of image frames, in which the capture includes noise reduction as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction, such as with cascaded IPEs, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Figure 2:
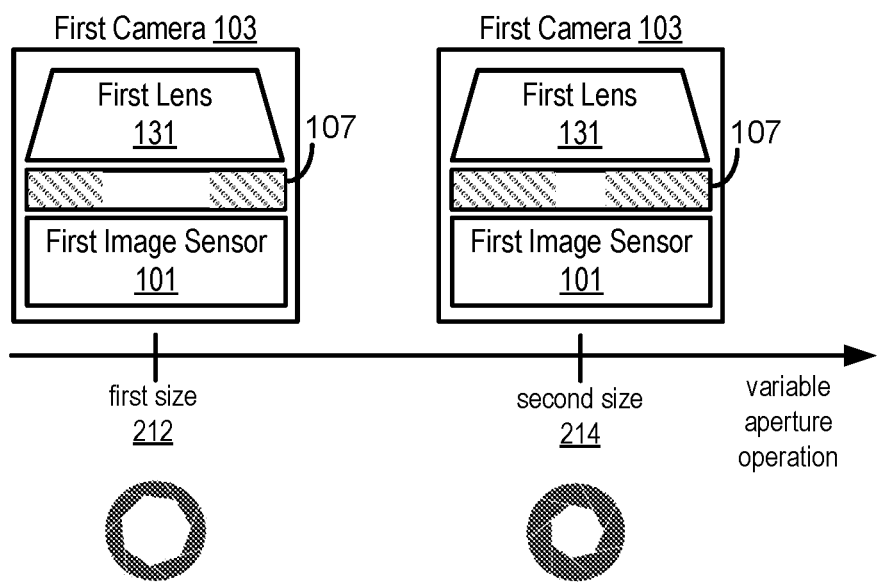
FIG. 2 is a block diagram illustrating operation of a variable aperture camera, such as in an image capture device.

In some embodiments of an image capture device, the first camera and/or second camera may support variable aperture (VA) operation, allowing the aperture to vary during the capture of image data. FIG. 2 is a block diagram illustrating operation of a variable aperture camera, such as in an image capture device. A first camera 103 may include the first lens 131, the first image sensor 101, and a variable aperture (VA) 107. The VA 107 may be, for example, a shutter or a plurality of blades that adjust to change a radius of an opening through the center of the plurality of blades. The VA 107 may be configured with a first size 212, with a larger opening indicated by a smaller "f-stop" value. The VA 107 may be configured with a second size 214, with a smaller opening indicated by a larger "f-stop" value. The VA 107 may have a plurality of configurations corresponding to different f-stop values, or the VA 107 may have an infinitely-adjustable aperture size to allow selection of aperture sizes between fixed aperture sizes.

Brightness in the image data may change with the changing aperture due to different light reaching the image sensor through the aperture. The brightness changes may be more pronounced during the transition of the VA camera, because the auto exposure (AE) system and other image processing in the camera pipeline may not have time to settle as the aperture changes. Brightness correction may be applied to image frames, such as the image frames captured during the VA transition, to obtain a series of image frames with substantially similar brightness that is unnoticeable to an observer. The brightness adjustment may be applied to an image frame based on the image data acquired during the aperture size transition and based on the image data acquired at the original aperture size by using the original aperture image data as a reference point. In some embodiments, the image processing described herein may be performed separate from the capture of the image data, such as when aspects of the image processing described herein are performed after acquiring the image data. That is, the brightness adjustment may be performed outside of the camera pipeline, with the camera pipeline (including the IFE 135 and IPE 136) storing data in memory 106, which is later retrieved from memory 106 for brightness adjustment and the adjusted image data stored back into memory 106.

The different aperture sizes 212 and 214 may result in a different amount of light reaching the image sensor 101, and thus different brightness between image data captured at sizes 212 and 214. An auto exposure (AE) algorithm may adjust gain on the image sensor 101 to obtain a similar brightness between the image data at sizes 212 and 214. However, the AE algorithm takes time to settle and reach a desired brightness. During this time there may be a noticeable change in brightness. When the aperture size is changing, the AE may not have sufficient time to settle because the aperture size is continually changing.

Figure 3:
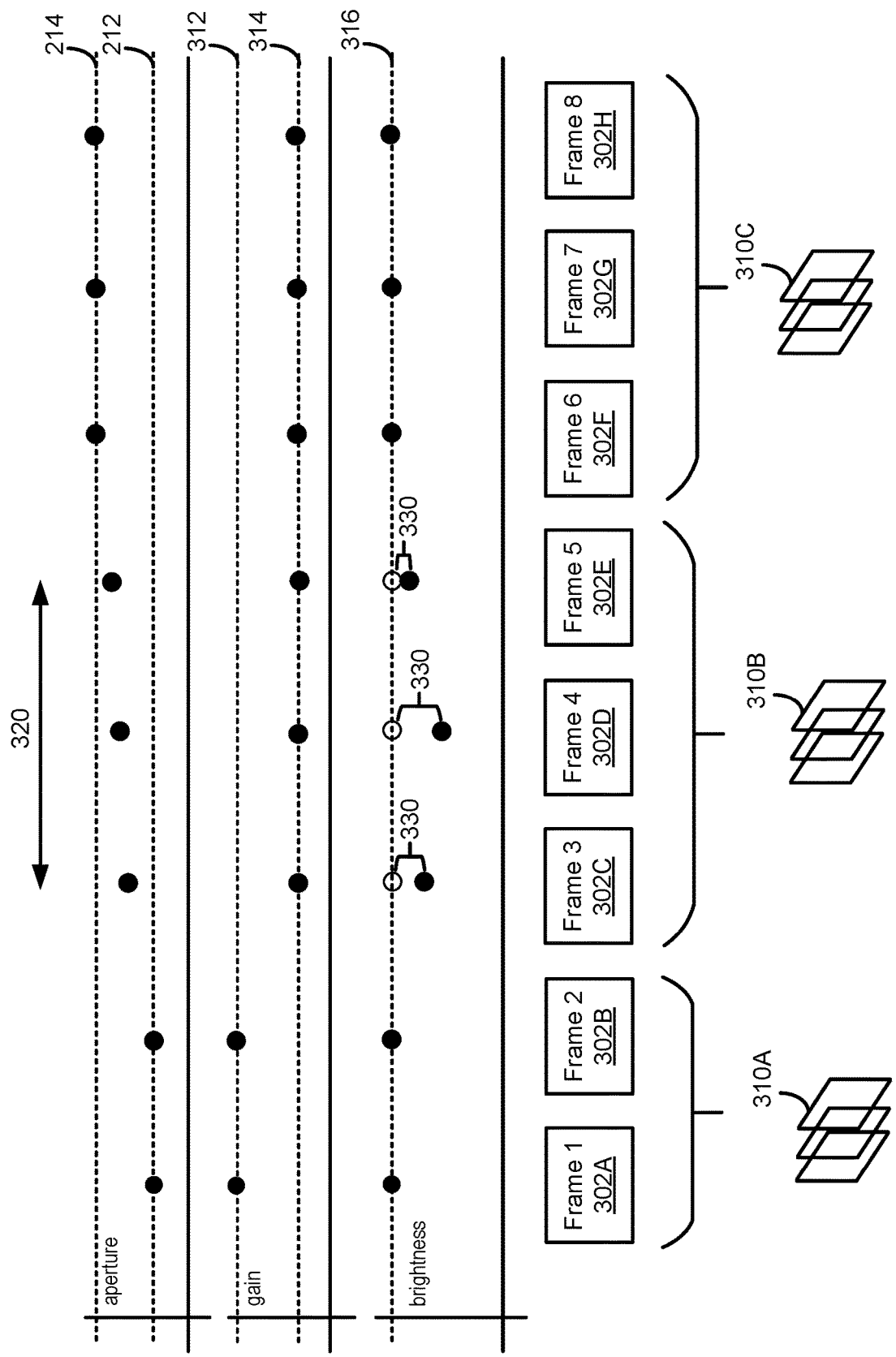
FIG. 3 is a timing diagram illustrating acquiring image data through an aperture size transition with processing of image frames acquired during the transition to obtain similar brightness according to some embodiments of the disclosure.

FIG. 3 is a timing diagram illustrating acquiring image data through an aperture size transition with processing of image frames acquired during the transition to obtain similar brightness according to some embodiments of the disclosure. Image data may be collected over a period of time from a VA camera to determine image frames 302A-H. Image frames 302A-B may be determined from image data acquired at aperture size 212. Image frames 302F-H may be determined from image data acquired at aperture size 214. Image frames 302C-E may be determined from image data acquired during the aperture size transition 320 from size 212 to size 214. The gain of the image sensor detecting light through the aperture may be adjusted by an AE algorithm from first gain value 312 at aperture size 212 to second gain value 314 for the aperture size transition and operation at aperture size 214. As a result of the aperture size and gain, the brightness of image frames 302A-H varies from one frame to the next during the aperture size transition 320. For example, the image frames 302A-B have a brightness 316, the brightness varies during aperture size transition 320, and the brightness stabilizes back to brightness 316 for image frames 302F-H.

The change in brightness may be reduced or eliminated by adjusting image frames in the aperture size transition 320 to have a brightness 316. A resulting stream of image frames may have no noticeable change in brightness during the aperture size transition, which increases image quality and improves user experience using a VA camera. For example, a stream of image frames may be determined from the image data by determining three groups of image frames 310A, 310B, and 310C. The image frames 310A may be determined based on first image data acquired at aperture size 212. The image frames 310B may be determined based on second image data acquired during aperture size transition 320 and based on the first image data by adjusting 330 the second image data to have a brightness 316 similar to image frames 310A. The image frames 310C may be determined based on third image data acquired at aperture size 214.

Figure 4:
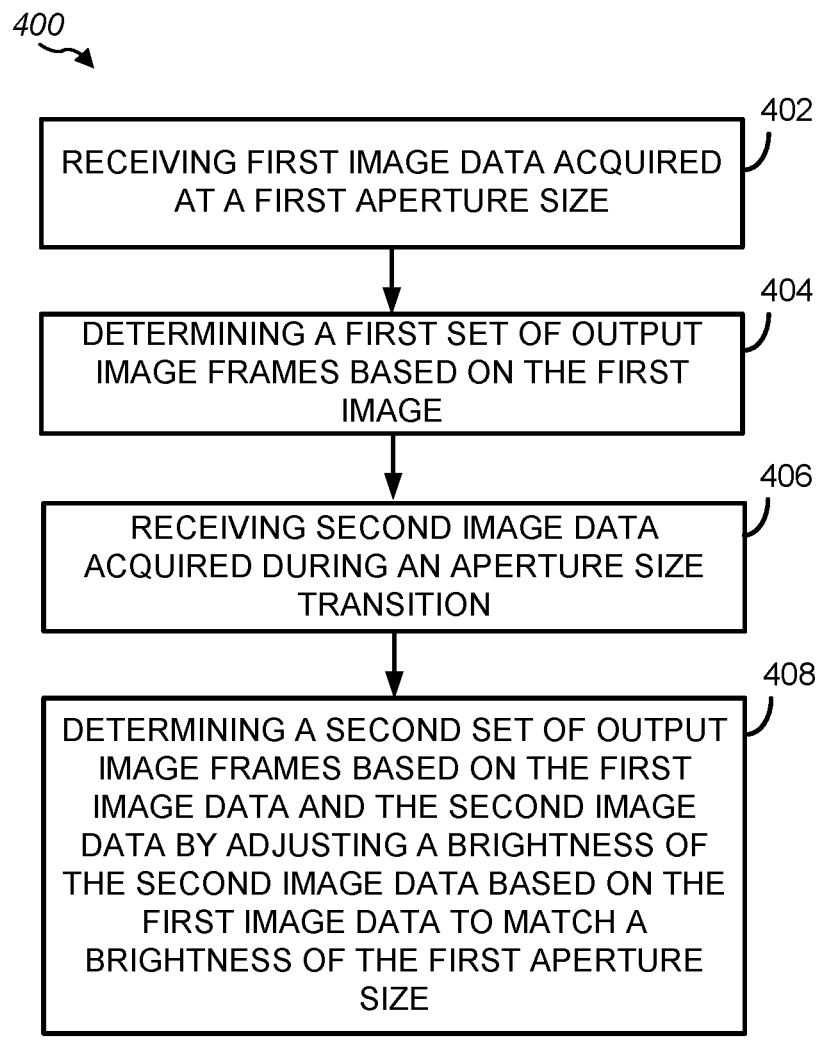
FIG. 4 is a flow chart illustrating an example method for adjusting brightness of image frames determined from a variable aperture (VA) camera according to some embodiments of the disclosure.

A method of image processing for use with VA cameras is shown in the flow chart of FIG. 4. FIG. 4 is a flow chart illustrating an example method for adjusting brightness of image frames determined from a variable aperture (VA) camera according to some embodiments of the disclosure.

A method 400 includes, at block 402, receiving first image data acquired at a first aperture size. At block 404, a first set of output image frames is determined based on the first image data received at block 402. In the example of FIG. 3, the image processing of blocks 402 and 404 may determine image frames 310A.

The method 400 continues with, at block 406, receiving second image data acquired during an aperture size transition. At block 408, a second set of output image frames is determined based on the second image data to match a brightness of the first aperture size by adjusting a brightness of the second image data. In the example of FIG. 3, the image processing of blocks 406 and 408 may determine image frames 310B.

In some embodiments, the VA camera may have limited feedback during the aperture size transition, such as in an open-loop aperture motor. With an open-loop aperture configuration, the AE algorithm does not know the current aperture of the VA camera during the aperture size transition, nor does the image signal processor (ISP) know when the aperture size transition is complete. The amount of brightness adjustment applied at block 408 during the aperture size transition may be used to determine when the aperture size transition is complete. For example, a determination that the aperture size transition is complete may be based on the adjusting of the brightness for an output image frame of the second set of output image frames being below a threshold adjustment amount. That is, when the adjustment applied to match characteristics between a current frame and a previous frame captured before the aperture size transition is small enough, the aperture size transition may be considered complete because the aperture size will have stabilized at a new aperture size and the camera control algorithms (e.g., AE) have had time to settle based on the current aperture size.

In some embodiments, global flicker correction may be applied as part of the adjustment at block 408. For example, a post-gain adjustment of block 408 may be used to compensate for brightness instabilities caused by flickering light-sources in the acquired image data.

In some embodiments, the adjustment of block 408 may include controlling the sensor operation in a consistent manner through the aperture size transition and using post-processing gain to adjust a characteristic. For example, when the characteristic is brightness, the image capture device operation may include measuring a brightness before an aperture size transition. During the aperture size transition, the image sensor is controlled with a fixed integration time and gain based on image sensor settings that correspond to a maximum aperture of the initial aperture size and the final aperture size. For each frame of image data captured during the aperture size transition, a brightness of the frame is measured using IFE statistics a post-gain adjustment determined to apply to image data to match a pre-transition brightness.

Figure 5:
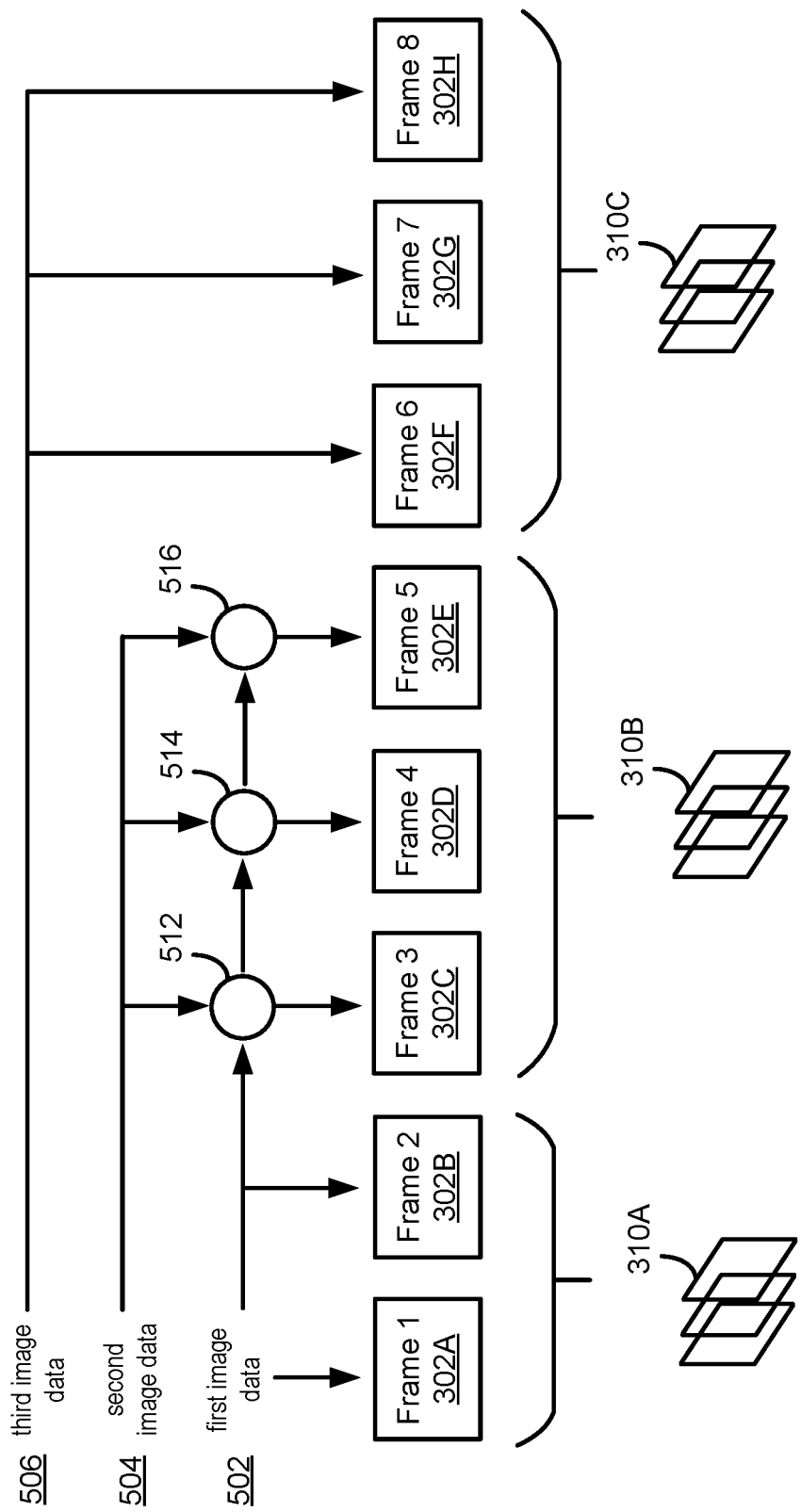
FIG. 5 is a block diagram illustrating a brightness adjustment in a variable aperture (VA) camera according to some embodiments of the disclosure.

An example of the modification of second image data at block 408 is shown in FIG. 5. FIG. 5 is a block diagram illustrating a brightness adjustment in a variable aperture (VA) camera according to some embodiments of the disclosure. First image data 502 may be formed used to determine frames 302A-B in image frames 310A. Second image data 504 may be processed with first image data 502 in processing blocks 512, 514, and 516 to determine image frames 302C, 302D, and 302E, respectively, in image frames 310B. In some embodiments, a single processing block performs the computation for each of the image frames 302C, 302D, and 302E. The processing blocks 512-516 may adjust the second image data 504 based on the first image data 502. In some embodiments, the adjustment may include averaging pixel values of the first image data 502 with pixel values of the second image data 504. In some embodiments, the adjustment may include determining a gain difference between the first image data 502 and the second image data 504 and modifying the pixel values of the second image data 504 corresponding to the gain difference. In some embodiments, the adjustment may include determining first image statistics for the first image data and second image statistics for the second image data and modifying the second image data 504 corresponding to the difference or ratio between the first image statistics and/or second image statistics. In some embodiments, the adjustment may include multiplying IPE Color Correction Matrix (CCM) coefficients with the second image data to apply a post-pipeline gain. This operation may be performed in the IPE or in other blocks, such as other blocks within the ISP, a digital gain block of the ISP, a gamma correction block of the ISP, or in the CPU.

In another aspect, the brightness match algorithm can calculate the aperture change and use that information to fine-tune and correct the final aperture. For example, a camera configured with variable aperture capability may include a voice coil motor (VCM) for controlling the aperture size. The VCM operation may result in imprecise aperture size control, such that the aperture size transition may not end at a desired end point aperture size. A brightness measurement on image data captured through the camera may be used to determine the current aperture size at the end of the aperture size transition, and a second aperture size transition may be initiated to compensate for missing the target aperture size during the first aperture size transition, in which the second aperture size transition is based on a difference between the brightness at the end of the first aperture size transition and an expected brightness for the end point aperture size.

The processing performed by processing blocks 512-516 may be performed outside of an image pipeline in the image capture device. Referring to the example image capture device of FIG. 1, the image signal processor 112 executing the IFE 135 and IPE 136 may form an image pipeline. The IFE 135 may receive image data from one or more of the first camera 103 and/or second camera 105 and perform processing on the image data, such as color correction, lens correction, rolling shutter correction, brightness correction, other corrections, and/or application of color filters. Output of the IFE 135 may be input to the IPE 136 for further processing, such as encoding into a particular file format such as JPEG or HEIF. The output of IPE 136 may be input to memory 106 for storage, display, transmission, and/or later retrieval. The IFE 135 and the IPE 136 form an image pipeline. The image data received from a VA camera may be processed in the image pipeline, output to memory 106, and later retrieved for further processing to determine corrected image data, which is then stored in memory 106.

In some embodiments, an adjustment of the second image data may be limited by a maximal aperture error. For example, a maximum adjustment amount may be computed as a subtraction of the square of the starting and ending aperture size. Using an aperture size transition of 2.8 to 2.2, a maximum adjustment amount may be set as 2.8^2/2^2, which is about two. A method for adjusting second image data using the maximum adjustment amount as a limit on the adjusting may include determining an adjustment limit based on the first aperture size before the aperture size transition; determining a second aperture size after the aperture size transition; and adjusting the brightness of second image data by: determining an adjustment to the brightness of the second image data based on the second image data and the first image data; limiting the adjustment based on the adjustment limit; and modifying the second image data to adjust the brightness of the second image data based on the adjustment after limiting the adjustment.

In some embodiments, brightness comparisons for adjusting second image data based on first image data may use portions of first image data that satisfy certain criteria. For example, when determining an adjustment amount for the second image data, the adjustment may be computed by comparing only portions of second image data and corresponding portions of first image data that are within a certain brightness range (e.g., not saturated by not being a maximum value and not too dark by being above a threshold brightness level). In some embodiments, the portions may be selected be determining a difference or ratio for different portions and removing portions with outlier values. The difference or ratio between the first and second image data in these portions may be used to determine an adjustment amount for matching the brightness of the second image data to the brightness of the first image data.

The second image data may be adjusted in such embodiments by: determining a plurality of statistical values for a corresponding plurality of portions of the first image data; and determining at least one outlier statistical value of the plurality of statistical values exceeds a threshold difference from a characteristic of the plurality of statistical values, wherein adjusting the brightness of the second image data comprises: modifying the second image data based on the plurality of statistical values without the at least one outlier statistical value.

Figure 6:
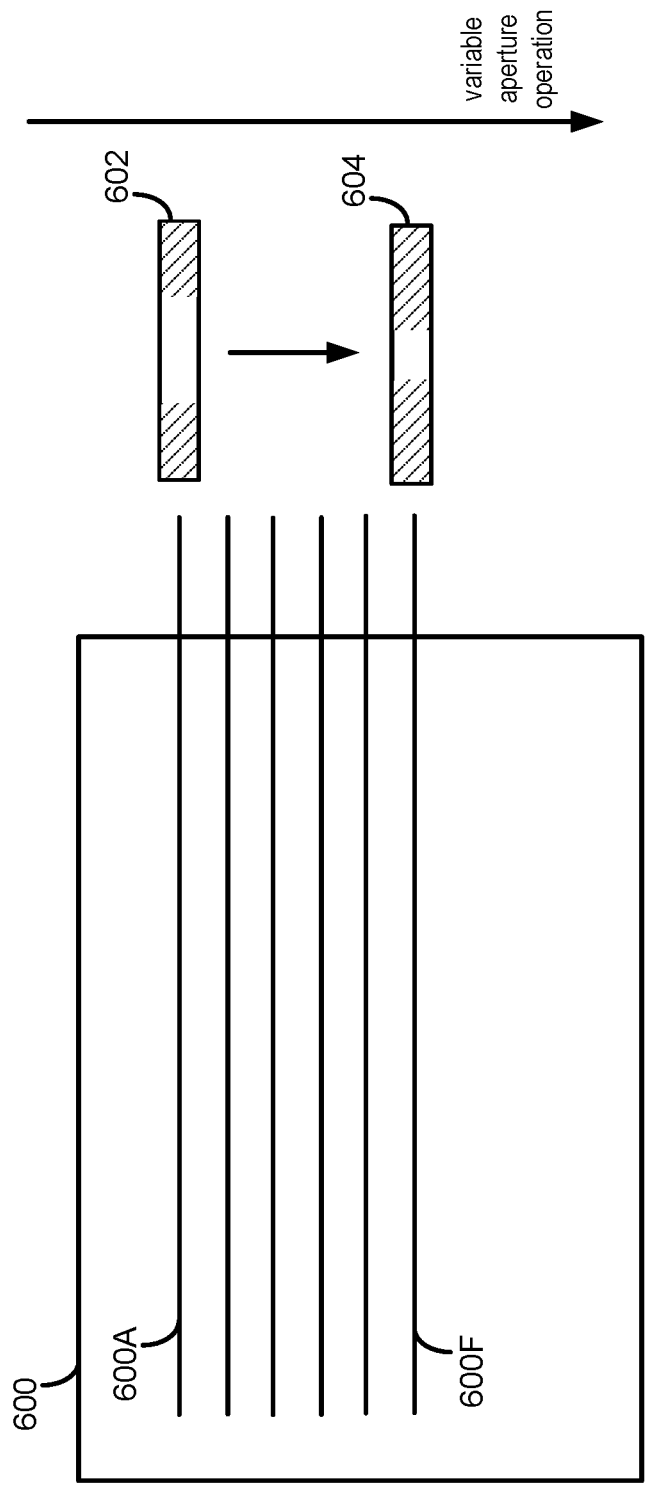
FIG. 6 is a block diagram illustrating image brightness adjustment during a rolling shutter correction (RSC) according to some embodiments of the disclosure.

In some embodiments, the adjustment of brightness of second image data may including adjusting different amounts within an image frame. For example, the image processing of FIG. 6 illustrates an image brightness adjustment performed during an image frame in which variable aperture. FIG. 6 is a block diagram illustrating image brightness adjustment during a rolling shutter correction (RSC) according to some embodiments of the disclosure. An aperture size transition may occur during the receiving of image data, such that different aperture sizes are used to acquire image data in different portions of the image frame. For example, line 600A of image data 600 may be received through aperture 602 having a first aperture size, and line 600F of the image data 600 may be received through aperture 604 having a second aperture size. Adjusting the brightness of the second image data may include applying a rolling shutter correction (RSC) to a first output image frame of a plurality of output image frames determined by an image capture device, and applying the RSC by: modifying a first portion of the second image data used for the first output image frame based on a difference in brightness between the first portion of the second image data and the first image data; and modifying a second portion of the second image data used for the first output image frame based on a difference in brightness between the second portion of the second image data and the first image data.

In one or more aspects, techniques for supporting image capture and/or image processing may include additional aspects, such as any single aspect or any combination of aspects described below or in connection with one or more other processes or devices described elsewhere herein. In a first aspect, supporting image processing may include an apparatus configured to capture images, such as a mobile device with a camera module configured with variable aperture capability. The apparatus is further configured to receiving first image data from a variable aperture (VA) camera acquired at a first aperture size; determining a first set of output image frames based on the first image data; receiving second image data from the VA camera acquired during an aperture size transition; and determining a second set of output image frames based on the first image data and the second image data, wherein determining the second set of output image frames comprises adjusting a characteristic of the second image data based on the first image data. The apparatus may be configured to perform these operations as by including hardware and/or software to operate a statistics stage and a capture stage, in which statistics are compared from the capture stage to a reference frame analyzed by the statistics stage and the current frame of the capture stage is adjusted to obtain a desired characteristic for the current frame.

Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, adjusting the characteristic of the second image data comprises adjusting a brightness of the second image data based on a brightness of the first image data. The brightness may be adjusted different amounts across an image frame of the image data, such that the brightness adjustment may adjust a uniformity of the image frame (such as by changing a brightness in the center of the image frame in comparison to a brightness in a corner of the image frame). The brightness may also be adjusted to modify vignetting, such as to reduce vignetting, and/or modify roll-off lens shading.

In a third aspect, in combination with one or more of the first aspect or the second aspect, the apparatus may also be configured for processing the second image data in an image signal processor (ISP) before adjusting the characteristic of the second image data; and storing the second image data in a memory from the ISP before adjusting the characteristic of the second image data, wherein adjusting the characteristic of the second image data comprises: retrieving the second image data from the memory; modifying the second image data to adjust the characteristic of the second image data; and storing the second image data into the memory.

In a fourth aspect, in combination with one or more of the first aspect through the third aspect, the apparatus may also be configured for commanding the aperture size transition before receiving the second image data; receiving third image data acquired after the aperture size transition; determining a third set of output image frames based on the third image data; and outputting the first set of output image frames, the second set of output image frames, and the third set of output image frames as a stream of output images.

In a fifth aspect, in combination with one or more of the first aspect through the fourth aspect, the apparatus may also be configured for determining the aperture size transition is complete based on the adjusting the characteristic for an output image frame of the second set of output image frames being below a threshold adjustment.

In a sixth aspect, in combination with one or more of the first aspect through the fifth aspect, the apparatus may also be configured for determining first image statistics for the first image data; and determining second image statistics for the second image data, wherein adjusting the characteristic of the second image data is based on the first image statistics and the second image statistics.

In a seventh aspect, in combination with one or more of the first aspect through the sixth aspect, determining the first image statistics for the first image data comprises: determining a plurality of statistical values for a corresponding plurality of portions of the first image data; and determining at least one outlier statistical value of the plurality of statistical values exceeds a threshold difference from a characteristic of the plurality of statistical values, wherein adjusting the characteristic of the second image data comprises: modifying the second image data based on the plurality of statistical values without the at least one outlier statistical value.

In an eighth aspect, in combination with one or more of the first aspect through the seventh aspect, the apparatus may also be configured for determining an adjustment limit based on the first aperture size and a second aperture size after the aperture size transition.

wherein adjusting the characteristic comprises: determining an adjustment to the characteristic of the second image data based on the second image data and the first image data; limiting the adjustment based on the adjustment limit; and modifying the second image data to adjust the characteristic of the second image data based on the adjustment after limiting the adjustment.

In a ninth aspect, in combination with one or more of the first aspect through the eighth aspect, adjusting the characteristic of the second image data comprises applying a rolling shutter correction (RSC) to a first output image frame of the plurality of output image frames, the applying the RSC comprising: modifying a first portion of the second image data used for the first output image frame based on a difference in the characteristic between the first portion of the second image data and the first image data; and modifying a second portion of the second image data used for the first output image frame based on a difference in the characteristic between the second portion of the second image data and the first image data.

In a tenth aspect, in combination with one or more of the first aspect through the ninth aspect, the apparatus may also be configured for outputting the first set of output image frames and the second set of output image frames in a sequence of frames as a preview of an output of the VA camera.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
    receiving first image data, from a variable aperture (VA) camera, acquired at a first aperture size;
    determining a first set of output image frames based on the first image data;
    determining first image statistics for the first image data;
    receiving second image data, from the VA camera, acquired during an aperture size transition;
    determining second image statistics for the second image data; and
    determining a second set of output image frames based on the first image data and the second image data, wherein determining the second set of output image frames comprises adjusting a characteristic of the second image data based on the first image data, the first image statistics, and the second image statistics.

2. The method of claim 1, wherein adjusting the characteristic of the second image data comprises adjusting a brightness of the second image data based on a brightness of the first image data.

3. The method of claim 1, further comprising:
    processing the second image data in an image signal processor (ISP) before adjusting the characteristic of the second image data; and
    storing the second image data in a memory from the ISP before adjusting the characteristic of the second image data,
    wherein adjusting the characteristic of the second image data comprises:
        retrieving the second image data from the memory;
        modifying the second image data to adjust the characteristic of the second image data; and
        storing the second image data into the memory.

4. The method of claim 1, further comprising:
    commanding the aperture size transition before receiving the second image data;
    receiving third image data acquired after the aperture size transition;
    determining a third set of output image frames based on the third image data; and
    outputting the first set of output image frames, the second set of output image frames, and the third set of output image frames as a stream of output images.

5. The method of claim 4, further comprising:
    determining the aperture size transition is complete based on the adjusting the characteristic for an output image frame of the second set of output image frames being below a threshold adjustment.

6. The method of claim 1, wherein determining the first image statistics for the first image data comprises:
    determining a plurality of statistical values for a corresponding plurality of portions of the first image data; and
    determining at least one outlier statistical value of the plurality of statistical values exceeds a threshold difference from a characteristic of the plurality of statistical values,
    wherein adjusting the characteristic of the second image data comprises:
        modifying the second image data based on the plurality of statistical values without the at least one outlier statistical value.

7. The method of claim 1, further comprising:
    determining an adjustment limit based on the first aperture size and a second aperture size after the aperture size transition,
    wherein adjusting the characteristic comprises:
        determining an adjustment to the characteristic of the second image data based on the second image data and the first image data;
        limiting the adjustment based on the adjustment limit; and
        modifying the second image data to adjust the characteristic of the second image data based on the adjustment after limiting the adjustment.

8. The method of claim 1, wherein adjusting the characteristic of the second image data comprises applying a rolling shutter correction (RSC) to a first output image frame of the second image data, the applying the RSC comprising:
    modifying a first portion of the second image data used for the first output image frame based on a difference in the characteristic between the first portion of the second image data and the first image data; and
    modifying a second portion of the second image data used for the first output image frame based on a difference in the characteristic between the second portion of the second image data and the first image data.

9. The method of claim 1, further comprising outputting the first set of output image frames and the second set of output image frames in a sequence of frames as a preview of an output of the VA camera.

10. An apparatus, comprising:
a memory storing processor-readable code; and
at least one processor coupled to the memory, the at least one processor configured to execute the processor-readable code to cause the at least one processor to perform operations including:
receiving first image data, from a variable aperture (VA) camera, acquired at a first aperture size;
determining a first set of output image frames based on the first image data;
determining first image statistics for the first image data;
receiving second image data, from the VA camera, acquired during an aperture size transition;
determining second image statistics for the second image data; and
determining a second set of output image frames based on the first image data and the second image data, wherein determining the second set of output image frames comprises adjusting a characteristic of the second image data based on the first image data, the first image statistics, and the second image statistics.

11. The apparatus of claim 10, wherein adjusting the characteristic of the second image data comprises adjusting a brightness of the second image data based on a brightness of the first image data.

12. The apparatus of claim 10, wherein the at least one processor is further configured to execute the processor-readable code to cause the at least one processor to perform operations including:
processing the second image data in an image signal processor (ISP) before adjusting the characteristic of the second image data; and
storing the second image data in a memory from the ISP before adjusting the characteristic of the second image data,
wherein adjusting the characteristic of the second image data comprises:
retrieving the second image data from the memory;
modifying the second image data to adjust the characteristic of the second image data; and
storing the second image data into the memory.

13. The apparatus of claim 10, wherein the at least one processor is further configured to execute the processor-readable code to cause the at least one processor to perform operations including:
commanding the aperture size transition before receiving the second image data;
receiving third image data acquired after the aperture size transition;
determining a third set of output image frames based on the third image data; and
outputting the first set of output image frames, the second set of output image frames, and the third set of output image frames as a stream of output images.

14. The apparatus of claim 13, wherein the at least one processor is further configured to execute the processor-readable code to cause the at least one processor to perform operations including:
determining the aperture size transition is complete based on the adjusting the characteristic for an output image frame of the second set of output image frames being below a threshold adjustment.

15. The apparatus of claim 10, wherein determining the first image statistics for the first image data comprises:

determining a plurality of statistical values for a corresponding plurality of portions of the first image data; and
determining at least one outlier statistical value of the plurality of statistical values exceeds a threshold difference from a characteristic of the plurality of statistical values,
wherein adjusting the characteristic of the second image data comprises:
modifying the second image data based on the plurality of statistical values without the at least one outlier statistical value.

16. The apparatus of claim 10, wherein the at least one processor is further configured to execute the processor-readable code to cause the at least one processor to perform operations including:
determining an adjustment limit based on the first aperture size and a second aperture size after the aperture size transition,
wherein adjusting the characteristic comprises:
determining an adjustment to the characteristic of the second image data based on the second image data and the first image data;
limiting the adjustment based on the adjustment limit; and
modifying the second image data to adjust the characteristic of the second image data based on the adjustment after limiting the adjustment.

17. The apparatus of claim 10, wherein adjusting the characteristic of the second image data comprises applying a rolling shutter correction (RSC) to a first output image frame of the second image data, the applying the RSC comprising:
modifying a first portion of the second image data used for the first output image frame based on a difference in the characteristic between the first portion of the second image data and the first image data; and
modifying a second portion of the second image data used for the first output image frame based on a difference in the characteristic between the second portion of the second image data and the first image data.

18. The apparatus of claim 10, wherein the at least one processor is further configured to execute the processor-readable code to cause the at least one processor to perform operations including:
further comprising outputting the first set of output image frames and the second set of output image frames in a sequence of frames as a preview of an output of the VA camera.

19. A non-transitory computer-readable medium storing instructions that, when executed by a processor, cause the processor to perform operations comprising:
receiving first image data from a variable aperture (VA) camera acquired at a first aperture size;
determining a first set of output image frames based on the first image data;
determining first image statistics for the first image data;
receiving second image data from the VA camera acquired during an aperture size transition;
determining second image statistics for the second image data; and
determining a second set of output image frames based on the first image data and the second image data, wherein determining the second set of output image frames comprises adjusting a characteristic of the second image data based on the first image data, the first image statistics, and the second image statistics.

20. The non-transitory, computer-readable medium of claim 19, wherein adjusting the characteristic of the second image data comprises adjusting a brightness of the second image data based on a brightness of the first image data.

21. The non-transitory, computer-readable medium of claim 19, wherein the operations further include one or more operations of:
  processing the second image data in an image signal processor (ISP) before adjusting the characteristic of the second image data; and
  storing the second image data in a memory from the ISP before adjusting the characteristic of the second image data,
  wherein adjusting the characteristic of the second image data comprises:
    retrieving the second image data from the memory;
    modifying the second image data to adjust the characteristic of the second image data; and
    storing the second image data into the memory.

22. The non-transitory, computer-readable medium of claim 19, wherein the operations further include one or more operations of:
  commanding the aperture size transition before receiving the second image data;
  receiving third image data acquired after the aperture size transition;
  determining a third set of output image frames based on the third image data; and
  outputting the first set of output image frames, the second set of output image frames, and the third set of output image frames as a stream of output images.

23. An apparatus, comprising:
  a camera comprising a variable aperture;
  a memory storing processor-readable code; and
  at least one processor coupled to the memory and to the camera, the at least one processor configured to execute the processor-readable code to cause the at least one processor to perform operations comprising:
    receiving first image data, from the camera, acquired at a first aperture size;
    determining a first set of output image frames based on the first image data;
    determining first image statistics for the first image data;
    receiving second image data, from the camera, acquired during an aperture size transition;
    determining second image statistics for the second image data; and
    determining a second set of output image frames based on the first image data and the second image data, wherein determining the second set of output image frames comprises adjusting a characteristic of the second image data based on the first image data, the first image statistics, and the second image statistics.

24. The apparatus of claim 23, wherein adjusting the characteristic of the second image data comprises adjusting a brightness of the second image data based on a brightness of the first image data.

25. The apparatus of claim 23, wherein the at least one processor comprises an image signal processor, and wherein the at least one processor is configured to perform operations comprising:
  processing the second image data in the image signal processor (ISP) before adjusting the characteristic of the second image data; and
  storing the second image data in the memory from the ISP before adjusting the characteristic of the second image data,
  wherein adjusting the characteristic of the second image data comprises:
    retrieving the second image data from the memory;
    modifying the second image data to adjust the characteristic of the second image data; and
    storing the second image data into the memory.

26. The apparatus of claim 25, wherein the adjusting the characteristic is performed by a second processor of the at least one processor different from the image signal processor (ISP).

27. The apparatus of claim 23, wherein the at least one processor is further configured to execute the processor-readable code to cause the at least one processor to perform operations including:
  commanding the aperture size transition before receiving the second image data;
  receiving third image data acquired after the aperture size transition;
  determining a third set of output image frames based on the third image data; and
  outputting the first set of output image frames, the second set of output image frames, and the third set of output image frames as a stream of output images.

* * * * *